(12) United States Patent
Frost et al.

(10) Patent No.: US 11,150,965 B2
(45) Date of Patent: Oct. 19, 2021

(54) FACILITATION OF REAL TIME CONVERSATIONS BASED ON TOPIC DETERMINATION

(71) Applicant: INTERNATIONAL BUSINESS MACHINES CORPORATION, Armonk, NY (US)

(72) Inventors: Keith Gregory Frost, Delaware, OH (US); Stephen Arthur Boxwell, Franklin, OH (US); Stanley John Vernier, Grove City, OH (US); Kyle Matthew Brake, Dublin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 16/446,980

(22) Filed: Jun. 20, 2019

(65) Prior Publication Data

US 2020/0401466 A1    Dec. 24, 2020

(51) Int. Cl.
| | | |
|---|---|---|
| G06F 9/54 | (2006.01) | |
| G10L 15/02 | (2006.01) | |
| H04L 29/06 | (2006.01) | |
| G10L 15/26 | (2006.01) | |
| G10L 15/18 | (2013.01) | |
| G06F 40/279 | (2020.01) | |

(52) U.S. Cl.
CPC .......... *G06F 9/542* (2013.01); *G06F 40/279* (2020.01); *G10L 15/02* (2013.01); *G10L 15/1822* (2013.01); *G10L 15/26* (2013.01); *H04L 65/1066* (2013.01)

(58) Field of Classification Search
CPC ....... G06F 9/542; G06F 40/279; G10L 15/02; G10L 15/1822; G10L 15/26; H04L 65/1066
See application file for complete search history.

(56) References Cited

U.S. PATENT DOCUMENTS

| | | |
|---|---|---|
| 6,185,532 B1 | 2/2001 | Lemaire et al. |
| 6,292,830 B1 | 9/2001 | Taylor et al. |
| (Continued) | | |

OTHER PUBLICATIONS

Ramadu, et al., "Topic based Semantic Clustering using Wikipedia Knowledge." Data Science & Engineering (ICDSE), 2012 International Conference on. IEEE, pp. 1-7.

(Continued)

*Primary Examiner* — Michael Colucci
(74) *Attorney, Agent, or Firm* — Cantor Colburn LLP; David Mattheis

(57) ABSTRACT

Methods, systems and computer program products for facilitating real time conversations based on topic determination are provided. Aspects include receiving one or more user topic profiles. Aspects also include receiving an audio recording of a conversation obtained from one or more audio sensors. Aspects also include converting the audio recording of the conversation to text. Aspects also include determining a topic of the conversation by applying a topic model to the text. Aspects also include determining one or more potentially interested users based on the topic of the conversation and the one or more user topic profiles. Aspects also include notifying the one or more potentially interested users that the conversation is occurring.

18 Claims, 6 Drawing Sheets

(56) References Cited

U.S. PATENT DOCUMENTS

| | | |
|---|---|---|
| 9,400,840 B2 | 7/2016 | Palmert |
| 2004/0019641 A1* | 1/2004 | Bartram ............... H04L 69/329 709/205 |
| 2004/0186762 A1 | 9/2004 | Beaven et al. |
| 2006/0004763 A1 | 1/2006 | Horvitz et al. |
| 2010/0205541 A1* | 8/2010 | Rapaport ............. G06F 16/285 715/753 |
| 2012/0284349 A1* | 11/2012 | Robinson ............. H04L 51/043 709/206 |
| 2012/0290950 A1* | 11/2012 | Rapaport ........... H04N 21/8358 715/753 |
| 2014/0215507 A1 | 7/2014 | Wouhaybi et al. |
| 2015/0332168 A1* | 11/2015 | Bhagwat ................ G06N 5/04 706/12 |
| 2017/0316080 A1 | 11/2017 | Brsebois et al. |
| 2019/0273627 A1* | 9/2019 | Whalin ................ G06Q 30/02 |
| 2019/0280996 A1* | 9/2019 | Dahir .................... G06N 20/00 |
| 2020/0175961 A1* | 6/2020 | Thomson ............. G10L 15/063 |

OTHER PUBLICATIONS

Sassi, et al., "User-based context modeling for music recommender systems," International Symposium on Methodologies for Intelligent Systems, Springer, Cham, 2017, pp. 157-167.

Wang, et al., "Real-time Change Point Detection using On-line Topic Models," Scientific Data Mining, National Research Council Canada, Proceedings of the 27th International Conference on Computational Linguistics, 2018, pp. 2505-2515.

Wasfi, "Collecting User Access Patterns for Building User Profiles and Collaborative Filtering," School of Computer Sciences, University of Science, IUI '99 Proceedings of the 4th international conference on Intelligent user interfaces, pp. 57-64.

\* cited by examiner

FACILITATION OF REAL TIME CONVERSATIONS BASED ON TOPIC DETERMINATION

BACKGROUND

The present invention generally relates to processing systems, and more specifically, to facilitating real time conversations based on topic determination.

Many technologies exist for facilitating real time conversations between people, such as telephones, cell phones, voice-over-IP (VoIP) technology, conference lines and video conferencing systems. Real-time communication between people is often critical in group environments, such as an office environment. A modern trend towards open office spaces may hamper effective communication due to the existence of a large amount of background noise that commonly occurs in such open environments.

SUMMARY

Embodiments of the present invention are directed to a computer-implemented method for facilitating real time conversations based on topic determination. A non-limiting example of the computer-implemented method includes receiving one or more user topic profiles. The method also includes receiving an audio recording of a conversation obtained from one or more audio sensors. The method also includes converting the audio recording of the conversation to text. The method also includes determining a topic of the conversation by applying a topic model to the text. The method also includes determining one or more potentially interested users based on the topic of the conversation and the one or more user topic profiles. The method also includes notifying the one or more potentially interested users that the conversation is occurring.

Embodiments of the present invention are directed to a system for facilitating real time conversations based on topic determination. The system includes a memory having computer readable computer instructions, and a processor for executing the computer readable instructions. The computer readable instructions include instructions for receiving one or more user topic profiles. The computer readable instructions also include instructions for receiving an audio recording of a conversation obtained from one or more audio sensors. The computer readable instructions also include instructions for converting the audio recording of the conversation to text. The computer readable instructions also include instructions for determining a topic of the conversation by applying a topic model to the text. The computer readable instructions also include instructions for determining one or more potentially interested users based on the topic of the conversation and the one or more user topic profiles. The computer readable instructions also include instructions for notifying the one or more potentially interested users that the conversation is occurring.

Embodiments of the invention are directed to a computer program product for facilitating real time conversations based on topic determination, the computer program product comprising a computer readable storage medium having program instructions embodied therewith. The computer readable storage medium is not a transitory signal per se. The program instructions are executable by a processor to cause the processor to perform a method. A non-limiting example of the method includes receiving one or more user topic profiles. The method also includes receiving an audio recording of a conversation obtained from one or more audio sensors. The method also includes converting the audio recording of the conversation to text. The method also includes determining a topic of the conversation by applying a topic model to the text. The method also includes determining one or more potentially interested users based on the topic of the conversation and the one or more user topic profiles. The method also includes notifying the one or more potentially interested users that the conversation is occurring.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
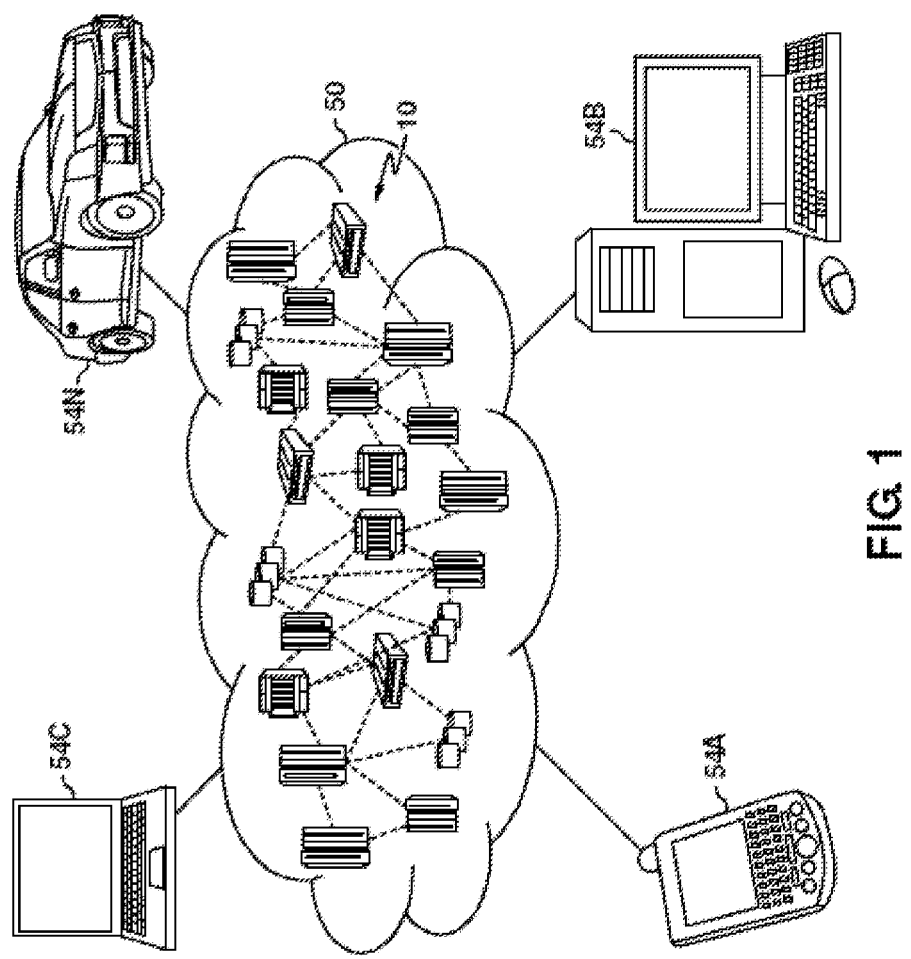
FIG. 1 depicts a cloud computing environment according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
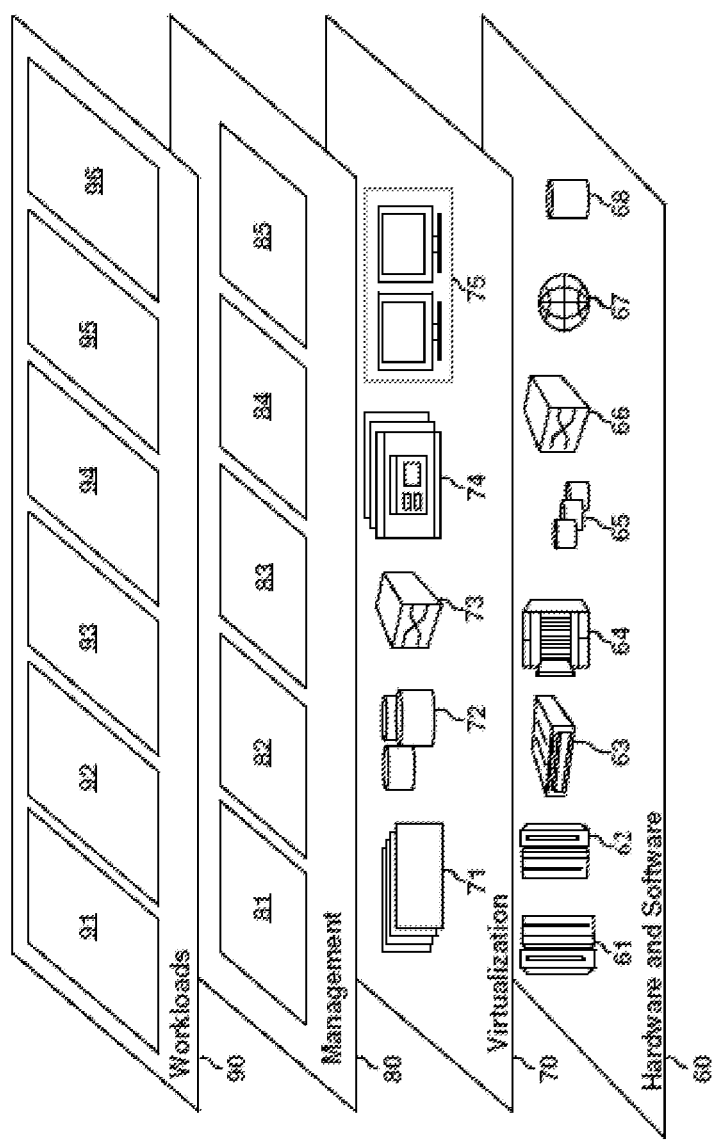
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facilitating real time conversations based on topic determination 96.

Figure 3:
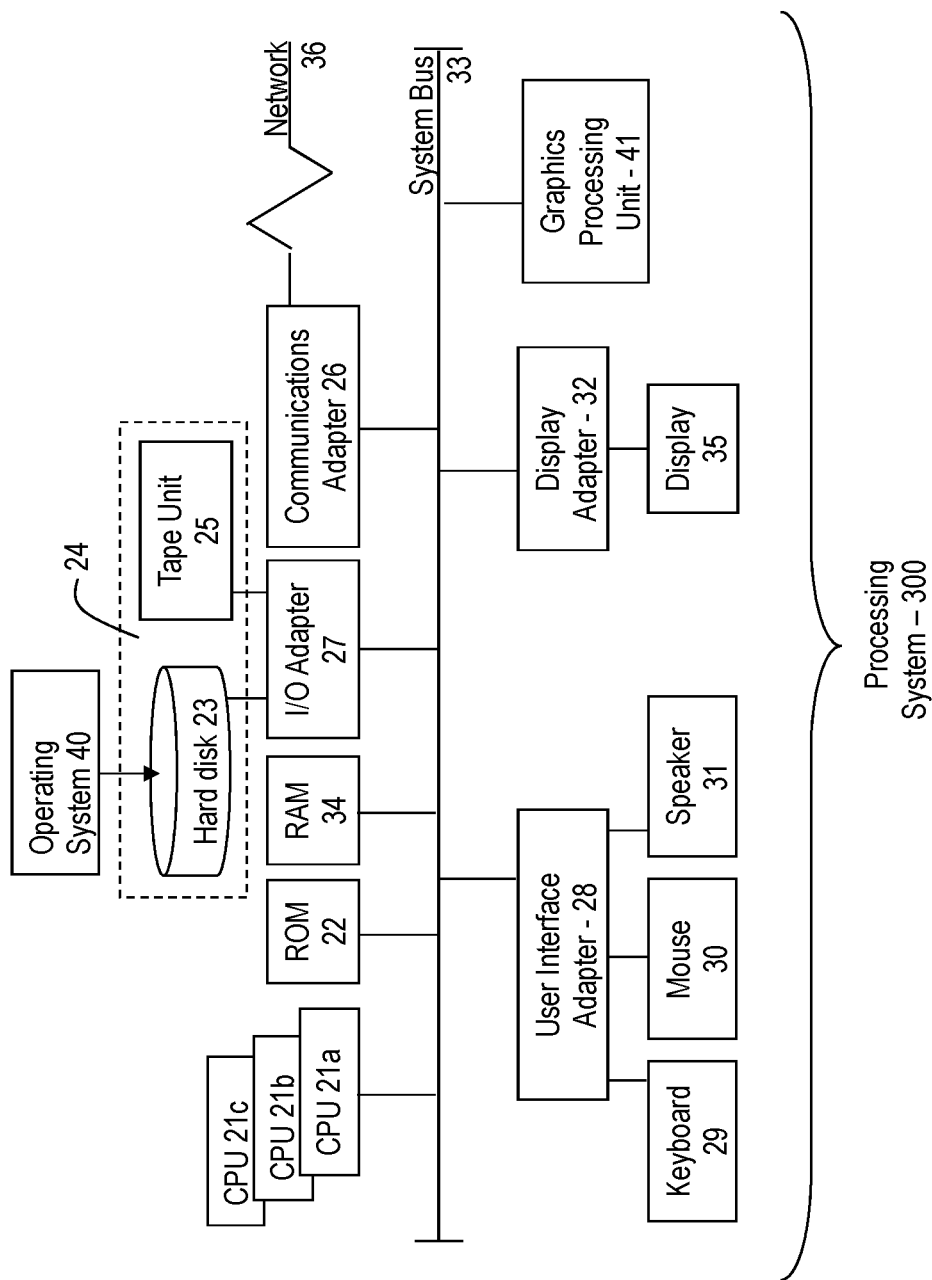
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, many technologies exist for facilitating real-time communication between people, such as telephones, cell phones, voice-over-IP (VoIP) technology, conference lines and video conferencing systems. Persistent video conferencing systems may create a persistent video and/or audio link between two remote locations (e.g., between two offices that are remote from one another) via computer-implemented technology. While these technologies are often useful, they generally require one party to set out to initiate a real-time conversation with another party. However, environments in which groups of people are working in the same space or working together, such as offices, libraries, research facilities, classrooms and the like, generally do not call for the use of such technologies but generally rely on face-to-face interactions between people. As individuals move and interact around the environment, different people may engage, disengage and re-engage in various conversations as dictated by the situation and the motivations of the individuals involved. A modern trend in office space design has been the creation of "open office spaces" which replace the more traditional individual walled off offices in favor of an open space in which people are not separated from one other. While such office space design may in some instances facilitate more collaborative work between individuals, it can also have the negative side effect of generating a significant amount of noise that may not be of interest to various people in the environment, which can serve as a distraction. Thus, to eliminate such distractions, many individuals may choose to wear noise-canceling headphones or may simply move to a more remote portion of the environment that is away from the distraction noise. However, this can be problematic because in such cases these individuals may miss out on relevant conversations being held by others in the environment that they would otherwise want to join, but due to the noise-avoidance measures taken the individuals generally may not be able to hear the conversations and thus remain ignorant of the existence of such conversations.

Turning now to an overview of the aspects of the invention, one or more embodiments of the invention address the above-described shortcomings of the prior art by providing systems and methods for facilitating real time conversations based on topic determination. The disclosed system may detect and collect audio data (e.g., conversations between people) from within the environment, convert the conversations to text and determine what the topic of each conversation is by inputting the text into a topic model. Based on user topic profiles that provide indications of subjects/topics that a given individual is interested in, the system can than identifying one or more users that are interested in an identified topic of conversation and notify such interested users that the conversation is occurring to provide the users(s) with an opportunity to join the conversation. For example, in some embodiments, the system may record a short clip of the conversation and play the clip to an interested user (e.g., via noise-reducing headphones worn by the interested user). In some embodiments, the system may provide interested users with the ability to join the conversation in real time, by for example, remotely being connected to other people in the conversation via a teleconference, videoconference or other such real-time electronic communication means, or by providing the interested user(s) with the physical location at which the conversation is occurring to allow the user(s) to physically join the conversation. The disclosed techniques can advantageously provide the technical benefit of an automated system for notifying users of relevant conversations that are occurring in real-time and facilitating interested users in joining the conversation. The disclosed techniques provide benefits of increasing productivity by allowing users to utilize noise-reduction techniques in an open environment to maintain focus, but without missing out on relevant discussions that may further the objectives of the group.

Figure 4:
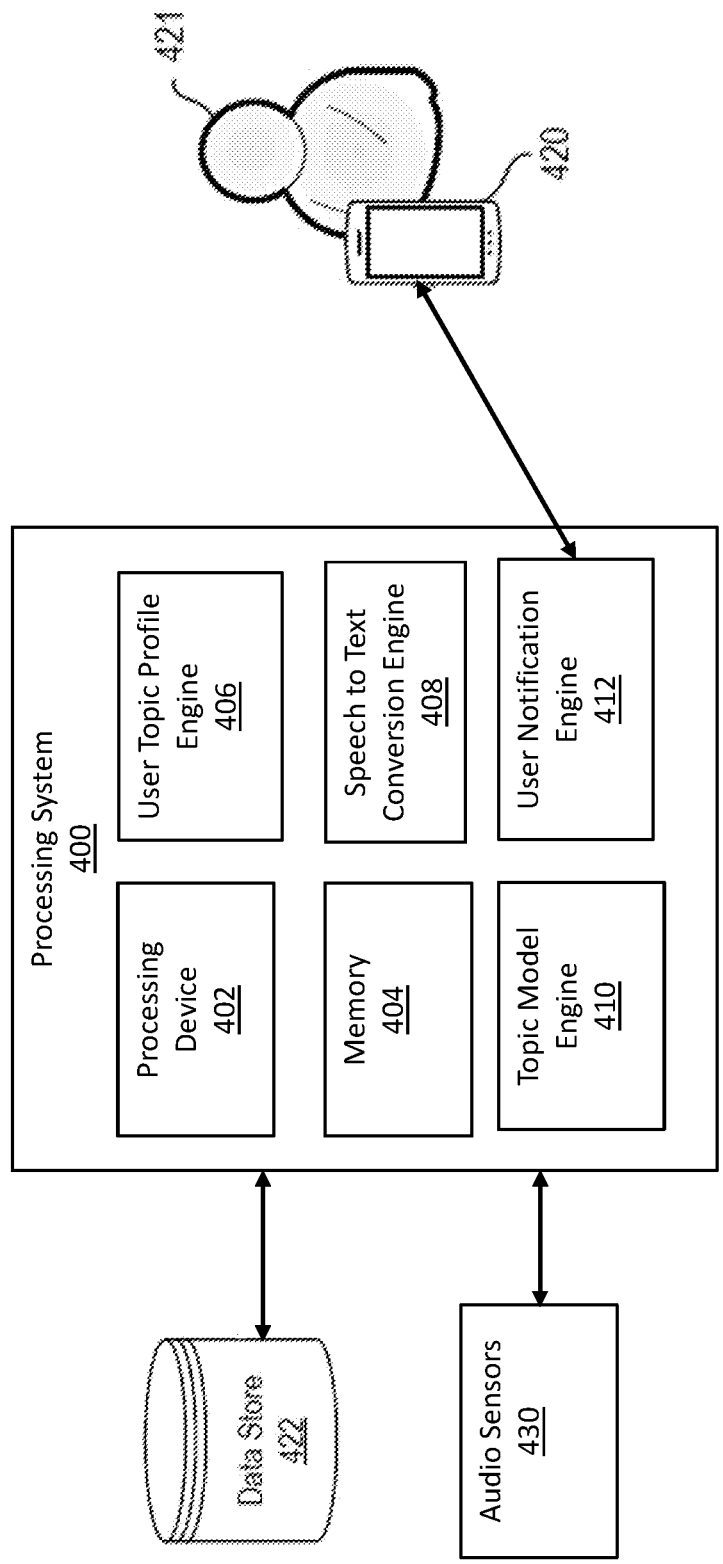
FIG. 4 depicts a system upon which facilitating real time conversations based on topic determination may be implemented according to one or more embodiments of the present invention.

Turning now to a more detailed description of aspects of the present invention, FIG. 4 depicts a block diagram of a processing system 400 for facilitating real time conversations based on topic determination, according to aspects of the present disclosure. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

The processing system 400 includes the processing device 402, the memory 404, a user topic profile engine 406, a speech-to-text conversion engine 408, a topic model engine 410 and a user notification engine 412. According to some embodiments, processing system 400 may include some or all of the elements of processing system 300 shown in FIG. 3. In some embodiments, elements of processing system 400 may be embodied in computer elements located within a network that may reside in the cloud, such as the cloud computing environment 50 described herein above and illustrated in FIGS. 1 and 2. The processing system 400 can be configured to communicate with a user device 420, which can output sound and/or video to a user 421. In some embodiments, user device 420 may receive user inputs (e.g., via tactile inputs, voice commands, or other such inputs). According to some embodiments, the processing system 400 may communicate with user device 420, data store 422 and audio sensor(s) 430 via communications network that may be one or more of, or a combination of, public (e.g., Internet), private (e.g., local area network, wide area network, virtual private network), and may include wireless and wireline transmission systems (e.g., satellite, cellular network, terrestrial networks, etc.).

In exemplary embodiments, user devices 420 can include, but are not limited to, a smartphone, a wearable device such as a smartwatch, an augmented reality headset, a tablet, a smart speaker, a television, a desktop computer, a laptop computer, headphones (e.g., sound reduction headphones), a video-conferencing system such as a persistent video conferencing system or any other suitable electronic device. The processing system 400 may store and access data, such as user topic profiles, via a connected data store 422. According to some embodiments, a user topic profile can be associated with a particular user and can include one or more subject scores (e.g., a score out of 1) associated with one or more corresponding subjects, which represent a degree of interest the user has in the associated topic. For example, a user topic profile associated with a given user may have a score of "0.1" for "Marketing," a score of "0.9" for "Information Technology" and a score of "0.5" for "Accounting," which can indicate that the user does not have much interest in marketing, has a mild interest in accounting and is very interested in information technology. Thus, in this example, it would be desirable to notify this user when conversations about information technology are occurring while not interrupting the user to notify the user about a present conversation about marketing.

According to some embodiments, the user topic profile engine 406 can be configured to generate user topic profiles associated with one or more users. In some embodiments, the user topic profile engine 406 can, for example, provide a questionnaire to user 421 (e.g., via user device 420) and can generate a user topic profile based on the user's responses. In some embodiments, a user 421 may create a user topic profile by inputting scores (e.g., via user device 420) associated with one or more subjects (e.g., "Marketing," "Information Technology," etc.) or by simply providing a binary indication of affirmative interest in one or more listed subjects for receipt by user topic profile engine 406. According to some embodiments, user topic profile engine 406 may adaptively change and maintain scores and/or designations of user interest in one or more subjects within a user's user topic profile by collecting and analyzing accessible information associated with the user (e.g., via public social media profiles, calendar events on a user's device, or any other such electronic information about a user). In some embodiments, user topic profile engine may utilize machine learning techniques to change and refine a user's user topic profile. For example, user topic profile engine 406 may observe the user's actions in response to being notified about a conversation that has a topic of interest that corresponds with the user's user topic profile. For example, if the user's user topic profile indicates that the user is interested in "Information Technology" (e.g., the score associated with "Information Technology" exceeds a predetermined threshold) and the user is notified about a real-time conversation that is occurring where the topic of conversation is "Information Technology" but the user declines to join the conversation, then user topic profile may reduce the score associated with "Information Technology" in the user's user topic profile. Thus, in some embodiments, user topic profile engine 406 can be configured to automatically determine and/or update user topic profiles.

As will be understood by those of skill in the art, the speech-to-text conversion engine 408 can receive audio signals obtained from audio sensors 430 and convert the audio signal to text. In other words, audio sensors 430 (e.g., microphones) can be placed within an environment such as an office, and may continually record conversations being held by individuals within range of the audio sensor(s) 430. This audio recording can then be converted to text, such as a transcript of a conversation, by the speech-to-text conversation engine 408. Any known or future developed technique for converting speech-to-text may be utilized by speech-to-text conversion engine. For example, in some embodiment's, IBM's Watson speech to text application programming interface (API) may be utilized by speech to text conversion engine 408.

According to some embodiments, the topic model engine 410 can be configured to receive text from the speech-to-text conversion engine 406 and determine one or more topics of conversation. As will be understood by those of skill in the art, topic modeling is the process of organizing texts based on their topic. For example, a topic model can be trained on two sets of news articles—one which includes entirely of sports reporting and another that includes entirely political reporting. Then, when the model is provided with a previously unseen news article, the topic model or models may be used to evaluate the new news article and can determine if the news article is a sports article or a politics article. This can be achieved with a variety of methods, such as using a naïve bayes unigram model, a maximum entropy model, a latent semantic model or any other such technique that is known in the art or developed in the future. Thus, according to some embodiments, topic model engine 410 may include or more topic models that can be applied to a text to determine one or more topics of conversation of the text. For example, in some embodiments, the topic model engine 410 may receive a text, apply one or more topic models to the text and output one or more corresponding subject scores that provide an indication of a degree to which a given subject is being discussed. For example, topic model engine 410 may receive text and output a score of "0.2" for "Marketing," a score of "5.7" for "Accounting" and a score of "9.1" for "Information Technology," which may indicate that the conversation is primarily about "Information Technology" but "Accounting" is also somewhat being discussed and "Marketing" is not being discussed much at all. In some embodiments, the topic model engine 410 may determine the topic of conversation by selecting the subject associated with the highest subject score. In some embodiments, the topic model engine 410 may determine zero or more topics of conversation associated with the text by selecting the zero or more subjects that have associated subject scores that are higher than a predetermined threshold.

According to some embodiments, the topic model engine 410 may periodically sample the text to determine updated subject scores. For example, in some embodiments, the topic model engine 410 may apply one or more topic models to the text every minute, every two minutes, every five minutes or in any other increment selected by a user. In this way, as the conversation continues and new text is generated, the topic model engine can update the subject scores. According to some embodiments, the topic model engine 410 can be configured to only determine subject scores for text that has occurred within a most recent predetermined amount of time, for example, it may only analyze the text that was spoken in the last ten minutes. According to some embodiments, the topic model engine 410 may apply a change point algorithm to the scores generated by repeatedly applying the one or more topic models to incoming text to detect changes in topic. For example, in some embodiments, a change point algorithm may determine that a new topic of conversation has occurred by determining that a previously high subject score has been replaced by a new current high subject score associated with a different subject. As will be understood by those of skill in the art, a change point algorithm used by topic model engine to determine a change in topic(s) of conversation may have many different forms that can include for example, determining a minimum difference in a change between two different subject scores over a specified period of time, determining that one or more subjects have scores that are above a predetermined threshold for more than a threshold period of time, or any other variation of relative or non-relative movement of subject scores over specified durations of time.

In some embodiments, the user notification engine 412 can notify one or more potentially interested users that a conversation having a topic of interest is occurring. For example, user notification engine 412 can be configured to receive subject score(s) or identified topic(s) associated with a conversation/text from topic model engine 410 and compare them to one or more user topic profiles to determine whether the topic(s) of conversation correspond to subjects of interest associated with each user topic profile. For example, if the topic of conversation as determined by the topic model engine 410 is "Information Technology," then user notification engine may determine which user topic profiles represent that the associated user has an interest in "Information Technology" (e.g., by determining that a subject score associated with the subject of "Information Technology" associated with various user topic profiles exceeds a predetermined threshold). After identifying one or more potentially interested users based on the topic of conversation and the user topic profiles, the user notification engine 412 can provide a notification or alert to a user that the conversation having the topic(s) of interest are occurring. For example, in various embodiments the user notification engine may provide a notification by sending an email to an email address associated with the user, by sending a text message to a phone number associated with the user, by sending an instant message to an account associated with the user, by providing an audio signal to be played by a user device 420 associated with the user that provides a notification of the conversation. In various embodiments, notifications can include one or more of the topic of conversation, the location of the conversation (i.e., as determined based on the known positions of the audio sensors 430), the participants of the conversation (e.g., as identified by speech-to-text conversion engine 408 using voice-recognition techniques), a portion of text from the conversation, and a recording of a portion of the conversation. According to some embodiments, the notification may include a user-selectable input for electronically joining the conversation in real time. For example, written notifications may include a link or a telephone number to join a teleconference or video conference, or an audio notification may ask the user if they would like to join the conversation and user 421 may orally respond in the affirmative or negative via user device 420. If the user responds in the affirmative, the processing system 400 can then electronically connect the user to the conversation. It will be understood that different users may receive notifications and/or invitations to join different active conversations based on the determined topic of each conversation and the user topic profiles associated with the users. Further, it will be understood that as topics of conversation change, further users may be notified of the conversations in accordance with their level of interest in the new topic as reflected by their user topic profile.

Figure 5:
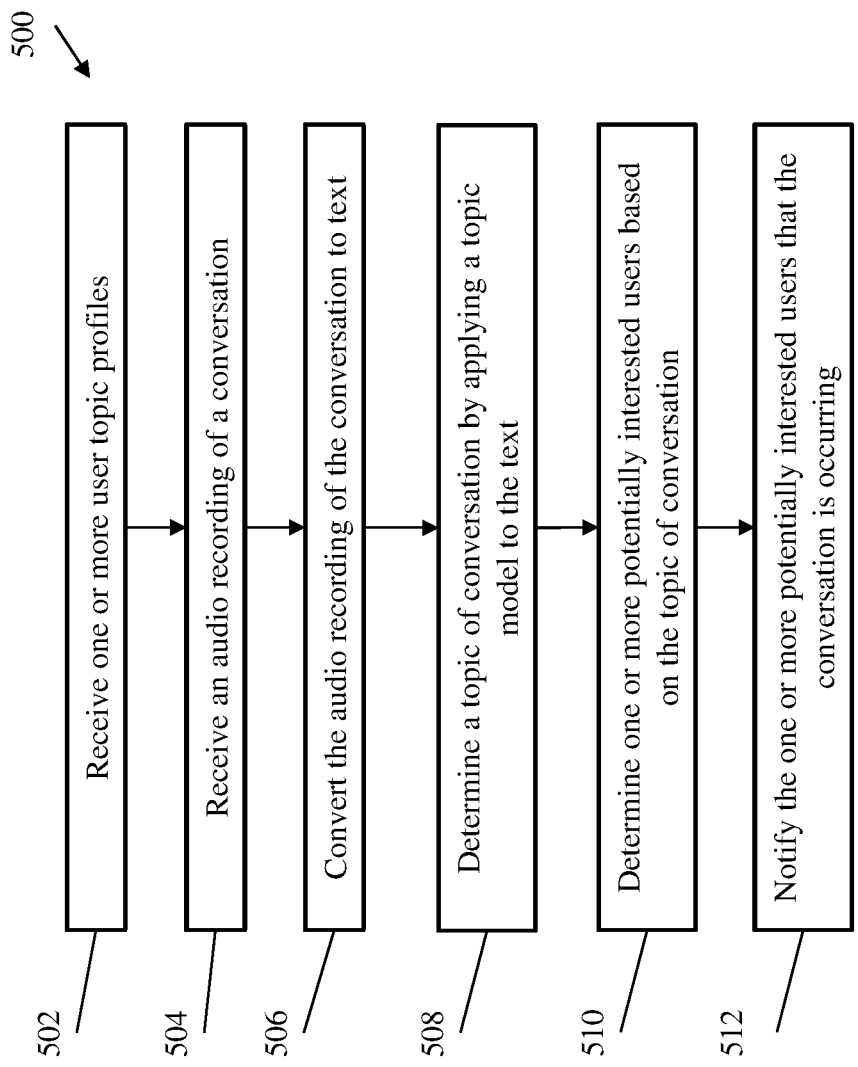
FIG. 5 depicts a flow diagram of a method for facilitating real time conversations based on topic determination according to one or more embodiments of the invention.

Turning now to FIG. 5, a flow diagram of a method 500 for facilitating real time conversations based on topic determination in accordance with an embodiment is shown. In one or more embodiments of the present invention, the method 500 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 500 begins at block 502 and includes receiving (e.g., via processing system 400) one or more user topic profiles. As described above, user topic profile engine 406 can receive and maintain one or more user topic profiles.

As shown at block 504, the method includes receiving (e.g., via processing system 400) an audio recording of a conversation obtained from one or more audio sensors. In some embodiments, the one or more audio sensors can be one or more microphones positioned within an office environment, such as microphones placed in known locations around the office environment or embedded in devices (e.g., desktop computers, mobile devices, etc.). In some embodiments, the one or more audio sensors can be microphones associated with a persistent video conferencing application operating at multiple locations. For example, an organization may have an office in New York City and an office in Atlanta that each maintain an active video conferencing link such that individuals that are remote to one another can communicate with each other in real time.

As shown at block 506, the method includes converting (e.g., via processing system 400) the audio recording of the conversation to text. For example, as will be appreciated by those of skill in the art, speech-to-text engine 408 can convert the audio recording to text.

As shown at block 508, the method includes determining (e.g., via processing system 400) a topic of the conversation by applying a topic model to the text. In some embodiments, more than one topic model may be applied to the text. According to some embodiments, determining a topic of the conversation by applying a topic model to the text can include generating one or more subject scores, wherein each subject score is associated with a subject of conversation, determining that a given subject score of the one or more subject scores exceeds a predetermined threshold and selecting a subject of conversation associated with the given subject score as the topic of conversation. In some embodiments, each user topic profile of the one or more user topic profiles can be one or more subjects of interest. For example, subjects of interest may include subjects or topics such as "Marketing," "Accounting," "Information Technology," "Security," "Management," or any other such subject or level of granularity of subject possible. In some embodiments, determining one or more potentially interested users may include determining a subset of the one or more user topic profiles that comprises user topic profiles comprising a subject of interest that matches the topic of conversation and designating one or more users associated with the subset of the one or more user topic profiles as being the one or more potentially interested users.

As shown at block 510, the method includes determining (e.g., via processing system 400) one or more potentially interested users based on the topic of the conversation and the one or more user topic profiles. For example, as described previously above, user notification engine 412 may compare the topic(s) of conversation or subject scores associated with a text received from topic model engine 410 and compare it to topics of interest and/or subject scores of one or more user topic profiles to identify potentially interested users.

As shown at block 512, the method includes notifying (e.g., via processing system 400) the one or more potentially interested users that the conversation is occurring. According to some embodiments, notifying the one or more potentially interested users that the conversation is occurring may include causing an audio output device associated with the user to play a sound indicative of the topic of the conversation and providing the user with an option of listening to the conversation live via the audio output device associated with the user. According to some embodiments, notifying the one or more potentially interested users that the conversation is occurring may include causing an audio output device associated with the user to play a portion of the audio recording and providing the user with an option of listening to the conversation live via the audio output device associated with the user. In some embodiments, the audio output device may be noise-reducing headphones or speakers (e.g., computer speakers that are local one or a small number of users).

According to some embodiments, the method 500 may further include electronically joining the user to the conversation in response to receiving a user-input opt-in signal from a device associated with the user, by for example, connecting the user to a teleconference or videoconference. In some embodiments, the method 500 may further include applying a change-point algorithm to determine a new topic of conversation, determining a new set of one or more potentially interested users based on the new topic of the conversation and the one or more user topic profiles and notifying the new set of one or more potentially interested users that the conversation is occurring. In this way, as topics of conversation naturally change over the course of time, other users who have an interest in a new topic of conversation can automatically be notified and/or invited to join the conversation.

Figure 6:
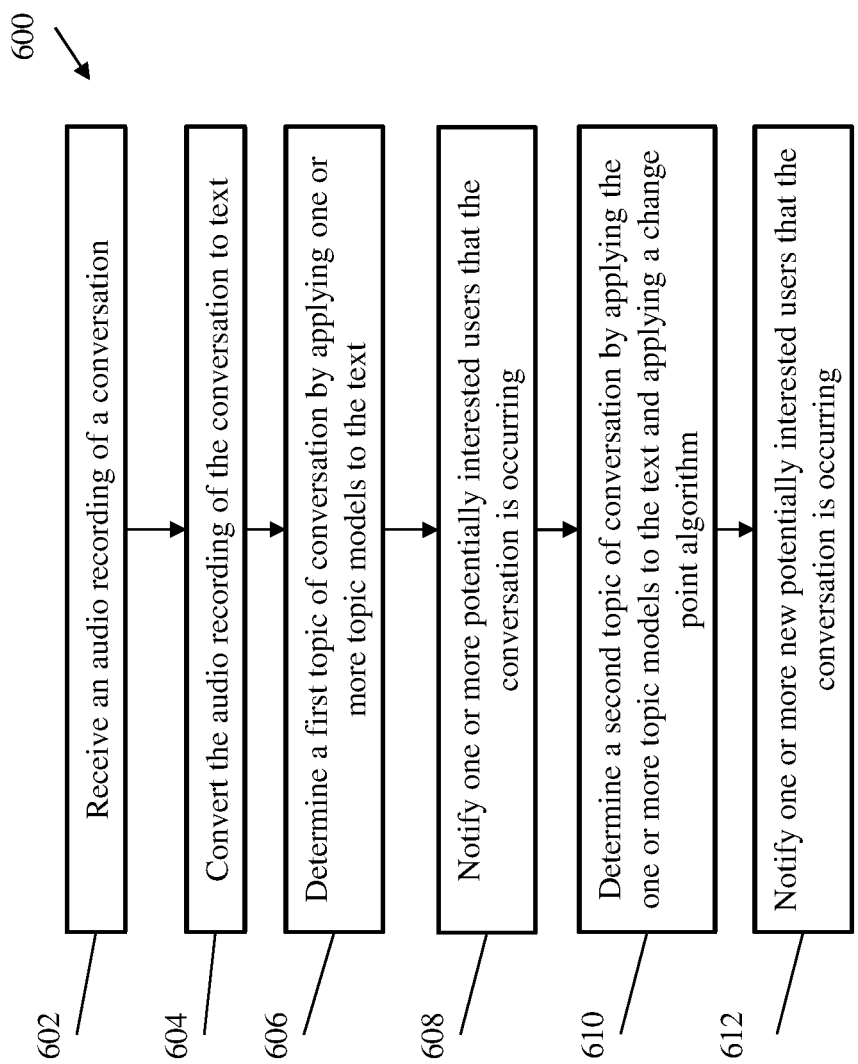
FIG. 6 depicts a flow diagram of a method for iteratively facilitating real time conversations based on topic determination according to one or more embodiments of the invention.

FIG. 6 depicts a flow diagram of a method 600 for iteratively facilitating real time conversations based on topic determination in accordance with an embodiment is shown according to one or more embodiments of the invention. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 600 begins at block 602 and includes receiving an audio recording of a conversation. As shown in block 604, the method 600 includes converting the audio recording of the conversation to text. As shown in block 606, the method 600 includes determining a first topic of conversation by applying one or more topic models to the text. As shown in block 608, the method 600 includes notifying one or more potentially interested users that the conversation is occurring. According to some embodiments, the functions performed at the aforementioned blocks may be performed in a manner similar to the similar steps if of method 500 described above.

As shown in block 610, the method 600 determining a second topic of conversation by applying the one or more topic models to the text and applying a change point algorithm. As described previously above, a change point algorithm can be applied to the outputs of the topic model engine 410 following continuous or subsequent analysis of the text via the topic models and identify when the topic of conversation has changed to a new topic.

As shown in block 612, the method 600 includes notifying one of more new potentially interested users that the conversation is occurring. For example, the system 400 may identify one or more new potentially interested users based on the second topic of conversation and the one or more user topic profiles and notify those new potentially interested users about the conversation.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving one or more user topic profiles;
    receiving an audio recording of a conversation obtained from one or more audio sensors, wherein the one or more audio sensors comprises one or more microphones positioned within an office environment;
    converting the audio recording of the conversation to text;
    determining, by applying a topic model to the text, a topic of the conversation;
    determining, based on the topic of the conversation and the one or more user topic profiles, one or more potentially interested users; and
    providing a notification by a user notification engine to the one or more potentially interested users that the conversation is occurring, wherein the notification includes a physical location at which the conversation is occurring to allow the one or more potentially interested users to physically join the conversation.

2. The computer-implemented method of claim 1, wherein notifying a user of the one or more potentially interested users that the conversation is occurring comprises:
    causing an audio output device associated with the user to play a sound indicative of the topic of the conversation; and
    providing the user with an option of listening to the conversation live via the audio output device associated with the user.

3. The computer-implemented method of claim 1, wherein notifying a user of the one or more potentially interested users that the conversation is occurring comprises:
    causing an audio output device associated with the user to play a portion of the audio recording; and
    providing the user with an option of listening to the conversation live via the audio output device associated with the user.

4. The computer-implemented method of claim 3 further comprising:
    responsive to receiving a user-input opt-in signal from a device associated with the user, electronically joining the user to the conversation.

5. The computer-implemented method of claim 4, wherein the audio output device comprises noise-reducing headphones.

6. The computer-implemented method of claim 1 further comprising:
    applying a change-point algorithm to determine a new topic of conversation;
    determining, based on the new topic of the conversation and the one or more user topic profiles, a new set of one or more potentially interested users; and
    notifying the new set of one or more potentially interested users that the conversation is occurring.

7. The computer-implemented method of claim 1, wherein the one or more audio sensors comprise microphones associated with a persistent video conferencing application operating at multiple locations.

8. The computer-implemented method of claim 1, wherein determining the topic of conversation by applying a topic model to the text comprises:
    generating one or more subject scores, wherein each subject score is associated with a subject of conversation;
    determining that a given subject score of the one or more subject scores exceeds a predetermined threshold; and
    selecting a subject of conversation associated with the given subject score as the topic of conversation.

9. The computer-implemented method of claim 8, wherein each user topic profile of the one or more user topic profiles comprises one or more subjects of interest and determining one or more potentially interested users comprises:
  determining a subset of the one or more user topic profiles that comprises user topic profiles comprising a subject of interest that matches the topic of conversation; and
  designating one or more users associated with the subset of the one or more user topic profiles as being the one or more potentially interested users.

10. A system comprising:
  a processor communicatively coupled to a memory, the processor configured to:
    receive one or more user topic profiles;
    receive an audio recording of a conversation obtained from one or more audio sensors, wherein the one or more audio sensors comprises one or more microphones positioned within an office environment;
    convert the audio recording of the conversation to text;
    determine, by applying a topic model to the text, a topic of the conversation;
    determine, based on the topic of the conversation and the one or more user topic profiles, one or more potentially interested users; and
    provide a notification by a user notification engine to the one or more potentially interested users that the conversation is occurring, wherein the notification includes a physical location at which the conversation is occurring to allow the one or more potentially interested users to physically join the conversation.

11. The system of claim 10, wherein notifying a user of the one or more potentially interested users that the conversation is occurring comprises:
  causing an audio output device associated with the user to play a sound indicative of the topic of the conversation; and
  providing the user with an option of listening to the conversation live via the audio output device associated with the user.

12. The system of claim 10, wherein notifying a user of the one or more potentially interested users that the conversation is occurring comprises:
  causing an audio output device associated with the user to play a portion of the audio recording; and
  providing the user with an option of listening to the conversation live via the audio output device associated with the user.

13. The system of claim 12, wherein the processor is further configured to:
  responsive to receiving a user-input opt-in signal from a device associated with the user, electronically join the user to the conversation.

14. The system of claim 13, wherein the audio output device comprises noise-reducing headphones.

15. A computer program product comprising a computer readable storage medium having program instructions embodied therewith the program instructions executable by a computer processor to cause the computer processor to perform a method comprising:
  receiving one or more user topic profiles;
  receiving an audio recording of a conversation obtained from one or more audio sensors, wherein the one or more audio sensors comprises one or more microphones positioned within an office environment;
  converting the audio recording of the conversation to text;
  determining, by applying a topic model to the text, a topic of the conversation;
  determining, based on the topic of the conversation and the one or more user topic profiles, one or more potentially interested users; and
  providing a notification by a user notification engine to the one or more potentially interested users that the conversation is occurring, wherein the notification includes a physical location at which the conversation is occurring to allow the one or more potentially interested users to physically join the conversation.

16. The computer program product of claim 15, wherein notifying a user of the one or more potentially interested users that the conversation is occurring comprises:
  causing an audio output device associated with the user to play a sound indicative of the topic of the conversation; and
  providing the user with an option of listening to the conversation live via the audio output device associated with the user.

17. The computer program product of claim 15, wherein notifying a user of the one or more potentially interested users that the conversation is occurring comprises:
  causing an audio output device associated with the user to play a portion of the audio recording; and
  providing the user with an option of listening to the conversation live via the audio output device associated with the user.

18. The computer program product of claim 17, wherein the method further comprises:
  responsive to receiving a user-input opt-in signal from a device associated with the user, electronically joining the user to the conversation.

* * * * *